United States Patent [19]

Carter

[11] 4,054,068
[45] Oct. 18, 1977

[54] LATHE TOOL

[76] Inventor: Walter L. Carter, 17156 Los Alimos, Granada Hills, Calif. 91344

[21] Appl. No.: 681,971

[22] Filed: Apr. 30, 1976

[51] Int. Cl.² .................. B23B 29/00; B26D 1/12
[52] U.S. Cl. .................. 82/36 R; 407/79; 407/111
[58] Field of Search ............. 29/96, 97, 98; 82/36 R

[56] References Cited

U.S. PATENT DOCUMENTS

| | | | |
|---|---|---|---|
| 1,266,116 | 5/1918 | Gibbs | 82/36 R |
| 1,306,039 | 6/1919 | Tufts | 29/96 |
| 1,379,539 | 5/1921 | Dolan, Sr. | 82/36 R |
| 1,776,335 | 9/1930 | Rauziers | 29/96 |
| 2,683,302 | 7/1954 | Bader | 29/96 |
| 3,245,288 | 4/1966 | Fried | 29/96 |
| 3,382,746 | 5/1968 | Tucker | 82/36 R |
| 3,603,185 | 9/1971 | Curry | 82/36 R |
| 3,815,454 | 6/1974 | Knott | 82/36 R |

FOREIGN PATENT DOCUMENTS

| | | | |
|---|---|---|---|
| 245,808 | 11/1960 | Australia | 82/36 R |
| 725,991 | 10/1942 | Germany | 29/96 |
| 568,875 | 4/1945 | United Kingdom | 29/96 |

*Primary Examiner*—Harrison L. Hinson
*Attorney, Agent, or Firm*—Nilsson, Robbins, Dalgarn, Berliner, Carson & Wurst

[57] ABSTRACT

A cut-off tool holder adapted to be swivelly mounted on a lathe turret, includes a block supporting an elongated cutting tool. A spring-loaded overhead clamping lid, releasably secured to the supporting block, firmly holds the cutting tool in place. The lid is pivotable on a cylinder which is disposed in juxtaposed hollowed-out portions of the support block and lid, in parallel alignment with the orientation of the cutting tool. The cylinder comprises a center section intermediate a pair of adjoining end sections of reduced diameter.

9 Claims, 5 Drawing Figures

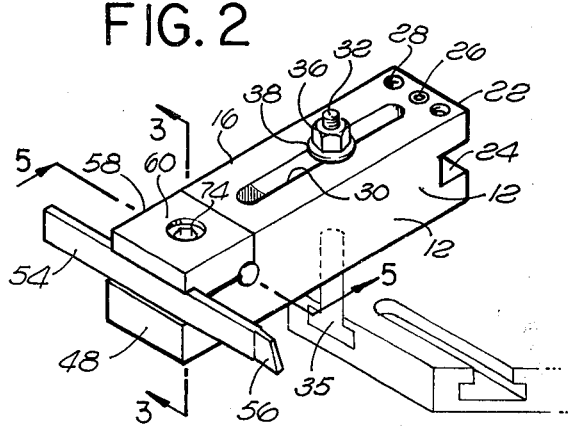
FIG. 2
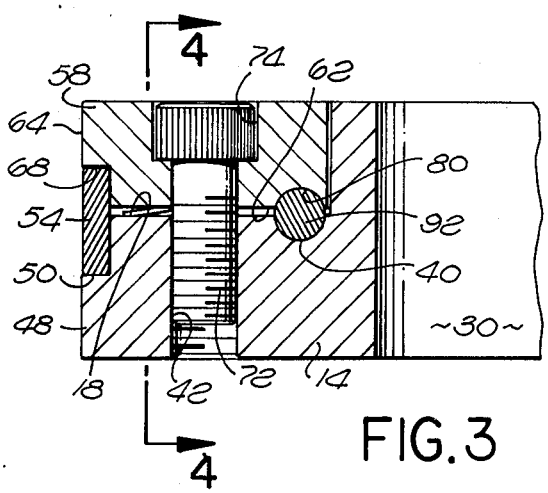
FIG. 3
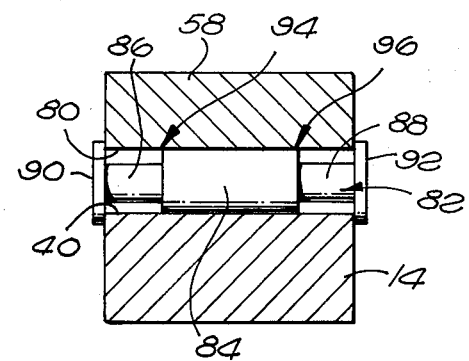
FIG. 5
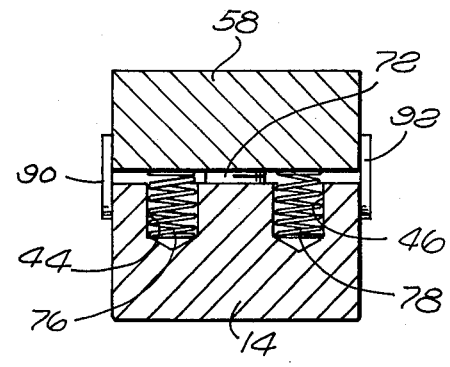
FIG. 4
FIG. 1

LATHE TOOL

FIELD OF THE INVENTION

The field of art to which the invention pertains includes the field of machine tools, and, more particularly, of cut-off tools which are removably supported in a cut-off tool holder.

BACKGROUND AND SUMMARY OF THE INVENTION

Machine tools such as cut-off tools which are mounted on a lathe turret or a similar tool holder are subjected to very strong distorting and deflecting forces, arising from the interaction of the cutting element and the metallic workpiece. The high speed demanded by lathe tool operations produces rapid vibrations which must be counteracted or absorbed, to prevent unnecessary play and lost motion. Tool geometry, tool speed, feed rate and similar factors can be designed to improve the performance of the tools and to overcome the dynamic instability resulting from the vibrations, although the complicated relationship between the cutting variables impose restrictions on the feasability of technical improvements. Prior art includes U.S. Pat. Nos. 256,668, 517,167, 902,169, 2,243,239, 3,140,627, 3,688,366 and 3,731,356.

The present invention is directed to resolve the various problems inherent in conventional designs by providing a cut-off tool holder for a metal cut-off tool which has sufficient rigidity for improved performance and hence, production, and which also permits rapid and easy adjustment or replacement of the cut-off tool for grinding and sharpening.

More specifically, the cut-off tool holder, according to the present invention, includes a substantially rectangular support block with a seating member which is inserted into a slot of the lathe turret and secured to the support block by a hexagonal nut. At its end opposite its attachment to the lathe turret, the support block has a horizontal shoulder formed in its side wall on which an elongated cutting element of rectangular cross-section is supported over part of its length. The shoulder is a predetermined distance, for most lathes, 0.5 or 0.375 inch, above the bottom surface of the tool holder. The cutting element which has a cutting blade at one of its ends is clamped against the support block by an overhead lid which includes a recess in which the upper portion of the cutting element is received. A plurality of helical compression springs which are seated in depressions provided therefor in the support block, abut at their opposite ends against the underside of the lid. A groove of semi-circular cross-section is hollowed out of the top surface of the support block, parallel to the orientation of the cutting element, and opens toward a mating identical groove formed on the underside of the clamping lid. Together, the grooves form a tubular enclosure for a cylindrical hingepin whose center section is joined at both ends to coaxial end sections of reduced diameter. The diameter of the tubular enclosure is slightly larger than the diameter of the center section of the hingepin which fits snugly thereagainst. The hingepin is formed with retaining ends normal to the axis thereof, and is disposed at the exterior of the support block and of the lid thereabove, parallel with and adjacent to the respective sidewalls, to hold the hingepin centered in the tubular enclosure. The opposite end of the tool holder is formed with a channel for securely receiving a turning or cut-off tool, pivotable to the back of the stock.

BRIEF DESCRIPTION OF THE DRAWINGS

FIG. 1 is an exploded perspective view of the cut-off tool holder;

FIG. 2 is a perspective view of a cut-off tool holder in accordance with the present invention;

FIG. 3 is a cross-sectional view taken along the line 3—3 of part of the tool holder of FIG. 2;

FIG. 4 is a cross-sectional view taken along the line 4—4 of FIG. 3; and

FIG. 5 is an enlarged cross-sectional view of the hinge-pin component taken along the line 5—5 of FIG. 2.

DETAILED DESCRIPTION

Referring to FIGS. 1 and 2, there is shown a cut-off tool holder comprising a substantially rectangular massive block 10 with a recessed portion at one end for the support of a shank 54 (FIG. 2) of a cut-off tool, as will be described hereinafter. The block 10 includes rear and forward adjoining parts, 12 and 14 respectively, of different heights with respect to the bottom surface 13 of the block. The plane top surfaces, 16 and 18 respectively, of the block parts 12 and 14, are set off from one another by a vertical wall 20. The free end wall 22 of the rear block part 12 is formed with a rectangular channel 24 which is adapted to receive therein a turning or cut-off tool (not shown), attachable by screws 26 vertically journaled through corresponding openings 28 provided therefor in the top section of the wall 22.

An elongated slot 30 extends vertically through the rear block part 12 and serves to locate therein a threaded stud 32 which is anchored in a T-shaped base 34. The base 34 in slidable in a T-shaped slot 35 provided in the lathe turret, so as to bring the tool holder with the cut-off tool in the proper center relation with the workpiece. Once this position is established, the upper end of the stud 32 is engaged by a washer 36 and a superposed hexagonal nut 38, which can be tightened against the surface wall 16 on both sides of the slot 30. It will be appreciated that the entire tool holder can be rotated and extended or distended respective the turret around the stud 32.

The plane surface wall 18 of the forward block part 14 is traversed by a horizontally aligned, upwardly open groove 40 of semi-circular cross section which extends proximate to, and lengthwise along the wall 20 separating the block parts 12 and 14. A threaded vertical bore 42 is formed at the center of the surface wall 18, and a pair of tapped depressions 44 and 46, respectively, are provided proximate the free end wall 48 of the block part 14. The free end wall 48 includes an inwardly extending horizontal shoulder 50 a predetermined distance above the bottom surface of the block. To accomodate the customary lathe dimensions, the predetermined distance can be 0.5 inch or 0.375 inch. The cut-off tool which consists of a shank 54 of substantially rectangular cross-section, with a cutting blade 56 at one of its ends, is supported over part of its length on the shoulder 50. The blade 56 may be integral with the shank 54 or removably secured thereto in known manner. In the view of FIG. 2 the blade is shown as a flat, thin element with predetermined rake angles, to permit the material to flow freely from the cutting edge as is well known in prior art.

A clamping lid 58 of substantially rectangular cross-section is formed with parallel top and bottom walls 60 and 62, respectively, of the same length and width as the plane surface 18 of the block part 14, and side walls 64, 65, 66 and 67 of the same height as that of the vertical wall 20. The side wall 64 of the lid 58 which, in the clamped position, is proximate to the wall 48 of the block part 14, includes a horizontal shoulder 68. In a preferred embodiment the lid 58 and the block part 14 are machined so that the top and bottom of the tool shank 54 abut against the shoulders 50 and 68 respectively, while one side wall of the shank abuts laterally against the recessed portions of the walls 48 and 64. This construction enables the shank 54 to be returned to exactly the same position with respect to the workpiece after temporary removal for grinding or sharpening of the blade 56.

It will be appreciated that the straight vertical end wall formed by the block wall 48, the free lateral surface of the shank 54 and the side wall 64 of the lid 58, as well as the continuous level surface formed by the top wall 60 of the lid and the contiguous plane surface 16 of the block part 12 define a cut-off tool holder of considerable compactness.

Referring more particularly to FIG. 3, the lid 58 is releasably secured to the block part 14 by a bolt 72 extending through a countersunk threaded hole 74 provided at the center of the lid 58, which is threadedly engaged in the bore 42 at the center of the block 14 therebelow.

Referring to FIG. 4, a pair of helical compression springs, 76 and 78 respectively, are seated in the depressions 44 and 46 formed in the block part 14, and abut at their upper ends against the underside 62 of the lid 58. The springs 76 and 78 serve to elevate the clamping lid 58 and to release the shank 54 when the bolt 72 is loosened, to permit adjustment of the cutting tool or removal for re-grinding or sharpening without removal of the lid.

Referring to FIG. 5 in conjunction with FIG. 1, the underside 62 of the lid 58 includes a groove 80 of semi-circular cross section which overlies and matches the groove 40 formed in the top surface 18 of the block part 14. When the lid 58 is in the clamping position, on top of the block part 14, the two grooves 40 and 80 together form a tubular enclosure for a horizontally disposed cylindrical hingepin 82. The hingepin 82 has a center section 84 intermediate two adjoining end sections, 86 and 88 respectively, which end sections 86 and 88 are of reduced diameter with respect to the center section. Retaining ends, which are shown in the form of circular discs, 90 and 92, are attached to the free ends of the sections 86 and 88, normal to the axis of the hingepin, and are disposed at the exterior of the support block 10, parallel with and adjacent to the sidewalls of the block 14 and the overlying lid 58. In this position the discs 90 and 92 cover the open ends of the tubular enclosure formed by the grooves 40 and 80 and secure the hingepin 82 against lateral displacement therein.

In a preferred embodiment, the diameter of the end sections 86 and 88 of the hingepin 82 is one half that of the diameter of the center section 84 which, in turn, is slightly smaller than the diameter of the tubular enclosure in which the hingepin is encased. The snug fit attained by virtue of this dimensional arrangement permits the center section 84 to serve as a pivot for the lid 58. Engaged on its underside 62 by the circumferential surface of the center section 84, the lid 58 converts the translational displacement caused by the vibrations of the cutting element into a slight rotational movement about the pivot and against the clamping action of the bolt 72. The disposition of the pivot at the center of the grooves 40 and 80 symmetrically distributes the thrust exerted on the lid 58 and prevents skewing. The major part of the force transfer is concentrated at the locations designated by the numerals 94 and 96, at opposite ends of the center section 84 bearing against the surface of the groove 80 in the lid 58, which have some degree of freedom of movement due to their proximity to the thinner end sections 86 and 88, respectively.

I claim:

1. In a cut-off tool holder having a planar bottom surface portion and adapted for releasably mounting on a lathe turret, including a support member defining a support surface for said cut-off tool an overhead clamping member and means for releasably securing said clamping member to said support means to provide clamping action thereto whereby to project a cut-off tool horizontally outwardly therefrom, the improvement thereby said clamping member comprises a lid having a tool retaining surface juxtaposed with said support surface and spaced vertically from said support surface, said support surface being spaced a predetermined distance from said planar bottom surface portion, and pivoting means for rotating said lid with respect to said support surface, said pivoting means including a hinge pin horizontally disposed intermediate said support member and clamping lid, parallel to the orientation of said cut-off tool, said hinge pin comprising a center section intermediate a pair of adjoining end sections of reduced diameter, portions only of said end sections extending exteriorly of said cut-off tool whereby to permit conversion of translational displacement of said lid, caused by vibration of said cut-off tool, into slight rotational movement about said hinge pin and against the clamping action of said securing means.

2. The improvement in accordance with claim 1 wherein said support member and said clamping member comprise a recess enclosing a longitudinal portion of said cut-off tool.

3. The improvement in accordance with claim 1 wherein said predetermined distance is 0.375 inch.

4. The improvement in accordance with claim 1 including retaining ends at the opposite ends of said hingepin and normal to the axis thereof, said retaining ends being positioned exteriorly of said cut-off tool holder and adjacent thereto.

5. The improvement in accordance with claim 4 wherein said support surface comprises an upwardly open first groove of semi-circular cross section extending therethrough, and said bottom surface of said clamping member comprises a mating second groove overlying said first groove, said first and second grooves forming a tubular cavity for locating said hinge pin.

6. The improvement of claim 1 including spring means vertically biasing said clamping member with respect to said support member.

7. The improvement in accordance with claim 6 wherein said spring means comprises a helical compression spring and said support surface comprises at least one depression forming a seat for said compression spring abutting at its opposite end against said bottom surface of said clamping means.

8. The improvement in accordance with claim 5 wherein the dimensions of said support surface and of said bottom surface are co-equal.

9. The improvement in accordance with claim 1 wherein said tool holder is formed with an elongated slot and is releasably and pivotably mounted by a stud therethrough to said turret, and including a cross channel through the free end wall of said holder and means for securing or turning a cut-off tool therein whereby said cross channel can be rotated to respective said stud.

* * * * *